US011672012B2

(12) United States Patent
Guey et al.

(10) Patent No.: US 11,672,012 B2
(45) Date of Patent: *Jun. 6, 2023

(54) DETECTION OF BEGINNING OF A TRANSMISSION SESSION IN NEW RADIO UNLICENSED SPECTRUM

(71) Applicant: MediaTek Inc., Hsinchu (TW)

(72) Inventors: Jiann-Ching Guey, Hsinchu (TW); Chun-Hsuan Kuo, San Jose, CA (US); Chien-Hwa Hwang, Hsinchu (TW); Chiou-Wei Tsai, Hsinchu (TW); Ming-Po Chang, Hsinchu (TW)

(73) Assignee: MediaTek Inc.

( * ) Notice: Subject to any disclaimer, the term of this patent is extended or adjusted under 35 U.S.C. 154(b) by 89 days.

This patent is subject to a terminal disclaimer.

(21) Appl. No.: 17/315,333

(22) Filed: May 9, 2021

(65) Prior Publication Data
US 2021/0266968 A1    Aug. 26, 2021

Related U.S. Application Data

(63) Continuation of application No. 16/377,118, filed on Apr. 5, 2019, now Pat. No. 11,039,475.

(Continued)

(51) Int. Cl.
*H04W 4/00* (2018.01)
*H04W 74/08* (2009.01)
(Continued)

(52) U.S. Cl.
CPC ....... *H04W 74/0816* (2013.01); *H04W 24/00* (2013.01); *H04W 48/16* (2013.01);
(Continued)

(58) Field of Classification Search
None
See application file for complete search history.

(56) References Cited

U.S. PATENT DOCUMENTS 10,231,131 B2 *  3/2019  Zhang ............... H04W 72/0413
11,039,475 B2 *  6/2021  Guey ................ H04W 72/1289
(Continued)

FOREIGN PATENT DOCUMENTS

CN  107734560 A  2/2018
CN  107852755 A  3/2018

OTHER PUBLICATIONS

China National Intellectual Property Administration, First Office Action for China Patent Application No. 201980001946.0, dated May 18, 2022.

(Continued)

*Primary Examiner* — Clemence S Han
(74) *Attorney, Agent, or Firm* — Han IP PLLC; Andy M. Han (57) ABSTRACT

Techniques and examples of efficient detection of a transmission session in New Radio unlicensed spectrum (NR-U) are described. An apparatus (e.g., user equipment (UE)) detects presence of an indication from a base station of a wireless network in an NR-U. The apparatus determines that a transmission opportunity (TXOP) follows the indication responsive to the detecting. The apparatus then receives a downlink (DL) transmission in the NR-U from the base station during the TXOP.

17 Claims, 9 Drawing Sheets

Related U.S. Application Data (60) Provisional application No. 62/654,273, filed on Apr. 6, 2018, provisional application No. 62/768,186, filed on Nov. 16, 2018.

(51) Int. Cl.

| | | |
|---|---|---|
| *H04W 74/00* | (2009.01) | |
| *H04W 24/00* | (2009.01) | |
| *H04W 48/16* | (2009.01) | |
| *H04W 72/12* | (2023.01) | |
| *H04W 72/23* | (2023.01) | |
| *H04L 5/00* | (2006.01) | |

(52) U.S. Cl.
CPC .......... *H04W 72/12* (2013.01); *H04W 72/23* (2023.01); *H04W 74/006* (2013.01); *H04L 5/001* (2013.01)

(56) References Cited

U.S. PATENT DOCUMENTS

| | | | |
|---|---|---|---|
| 2017/0339530 A1 | 11/2017 | Maaref | |
| 2018/0227911 A1* | 8/2018 | Belghoul | .......... H04W 72/1268 |
| 2018/0332620 A1* | 11/2018 | Malladi | .................... H04W 4/70 |
| 2019/0059085 A1* | 2/2019 | Sun | ........................ H04L 5/0082 |
| 2019/0090161 A1* | 3/2019 | Fan | ........................ H04W 72/04 |
| 2019/0090230 A1* | 3/2019 | Mukherjee | .......... H04W 74/004 |
| 2019/0090279 A1* | 3/2019 | Sun | ........................ H04W 72/14 |
| 2019/0104514 A1* | 4/2019 | Chendamarai Kannan ................. H04W 72/082 |
| 2019/0132876 A1* | 5/2019 | Shikari | ................. H04L 5/0098 |
| 2019/0141723 A1* | 5/2019 | Zhang | ............... H04W 74/0816 |
| 2019/0166621 A1* | 5/2019 | Yerramalli | ............ H04W 16/14 |
| 2019/0190668 A1* | 6/2019 | Lei | ........................ H04L 1/0017 |
| 2019/0191456 A1* | 6/2019 | Koorapaty | ........ H04W 74/0816 |
| 2019/0246425 A1* | 8/2019 | Zhang | ................ H04W 74/008 |
| 2020/0059961 A1* | 2/2020 | Do | .................... H04W 72/0453 |
| 2020/0187249 A1* | 6/2020 | Yang | .................... H04L 1/1819 |
| 2020/0228230 A1* | 7/2020 | Mukherjee | ............ H04L 5/0055 |

OTHER PUBLICATIONS

Qualcomm Incorporated, "TxOP Frame Structure for NR unlicensed", 3GPP TSG RAN WG1 Meeting #92, R1-1802866, Athens, Greece, Feb. 26-Mar. 2, 2018.

"Potential solutions and techniques for NR unlicensed", 3GPP R1-1802865, Feb. 26-Mar. 2, 2018.

* cited by examiner

DETECT, BY A PROCESSOR OF A USER EQUIPMENT (UE), PRESENCE OF AN INDICATION FROM A BASE STATION OF A WIRELESS NETWORK IN A NEW RADIO UNLICENSED SPECTRUM (NR-U)
810

DETERMINE, BY THE PROCESSOR, THAT A TRANSMISSION OPPORTUNITY (TXOP) FOLLOWS THE INDICATION IN TIME RESPONSIVE TO THE DETECTING
820

RECEIVE, BY THE PROCESSOR, A DOWNLINK (DL) TRANSMISSION IN THE NR-U FROM THE BASE STATION DURING THE TXOP
830

DETECT, BY A PROCESSOR OF A USER EQUIPMENT (UE), A LEADING PHYSICAL DOWNLINK CONTROL CHANNEL (PDCCH) IN A DOWNLINK (DL) TRANSMISSION OPPORTUNITY (TXOP) FROM A BASE STATION OF A WIRELESS NETWORK IN A NEW RADIO UNLICENSED SPECTRUM (NR-U)
910

MONITOR SOME BUT NOT ALL OF A PLURALITY OF ORTHOGONAL FREQUENCY-DIVISIONAL MULTIPLEXING (OFDM) SYMBOLS IN EACH SLOT
912

BUFFER PACKETS OF AN AMOUNT OF RECEIVED SIGNAL
914

DECODE A PHYSICAL DOWNLINK SHARED CHANNEL (PDSCH) IN THE BUFFERED PACKETS, THE PDSCH PRECEDING THE LEADING PDCCH
916

RECEIVE, BY THE PROCESSOR, A DL TRANSMISSION IN THE NR-U FROM THE BASE STATION DURING THE DL TXOP
920

FIG. 9

DETECTION OF BEGINNING OF A TRANSMISSION SESSION IN NEW RADIO UNLICENSED SPECTRUM

CROSS REFERENCE TO RELATED PATENT APPLICATION

The present disclosure is part of a continuation of U.S. patent application Ser. No. 16/377,118, filed 5 Apr. 2019, which claims the priority benefit of U.S. Provisional Patent Application Nos. 62/654,273 and 62/768,186, filed on 6 Apr. 2018 and 16 Nov. 2018, respectively. Contents of aforementioned applications are herein incorporated by reference in their entirety.

TECHNICAL FIELD

The present disclosure is generally related to mobile communications and, more particularly, to efficient detection of a transmission session in New Radio (NR) unlicensed spectrum (NR-U).

BACKGROUND

Unless otherwise indicated herein, approaches described in this section are not prior art to the claims listed below and are not admitted as prior art by inclusion in this section.

In NR-U bands, a device needs to perform listen-before-talk (LBT) before any transmission. If no other transmission is detected during an LBT phase, the device can proceed with its transmission. As a result, a device (e.g., a user equipment (UE) or a base station) can start its transmission at any time when no other transmission is detected during LBT. For NR-U bands, a frame boundary is established between a base station and a UE. Typically a radio frame contains ten sub-frames or slots. Moreover, typically each sub-frame (or slot) contains fourteen orthogonal frequency-division multiplexing (OFDM) symbols. A device can therefore potentially start its transmission at any symbol in a sub-frame due to the uncertainty of LBT.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of aforementioned issue, an objective of the present disclosure is to provide various proposed schemes for a device (e.g., UE) to efficiently detect the beginning of a downlink (DL) transmission (from a base station to the UE) session, also known as transmission opportunity (TXOP).

In one aspect, a method may involve a processor of a UE detecting presence of an indication from a base station of a wireless network in an NR-U. The method may also involve the processor determining that a TXOP follows the indication in time responsive to the detecting. The method may further involve the processor receiving a DL transmission in the NR-U from the base station during the TXOP.

In one aspect, a method may involve a processor of a UE detecting a leading physical downlink control channel (PDCCH) in a DL TXOP from a base station of a wireless network in an NR-U. The method may also involve the processor receiving a DL transmission in the NR-U from the base station during the DL TXOP. In detecting, the method may involve the processor performing either: (i) monitoring some but not all of a plurality of OFDM symbols in each slot; or (ii) monitoring by: (a) buffering packets of an amount of received signal; and (b) decoding a physical downlink shared channel (PDSCH) in the buffered packets, the PDSCH preceding the leading PDCCH.

It is noteworthy that, although description provided herein may be in the context of certain radio access technologies, networks and network topologies such as 5G NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art.

In the description below, details of well-known features and techniques may be omitted to avoid unnecessarily obscuring the presented embodiments and implementations.

Overview

Figure 1:
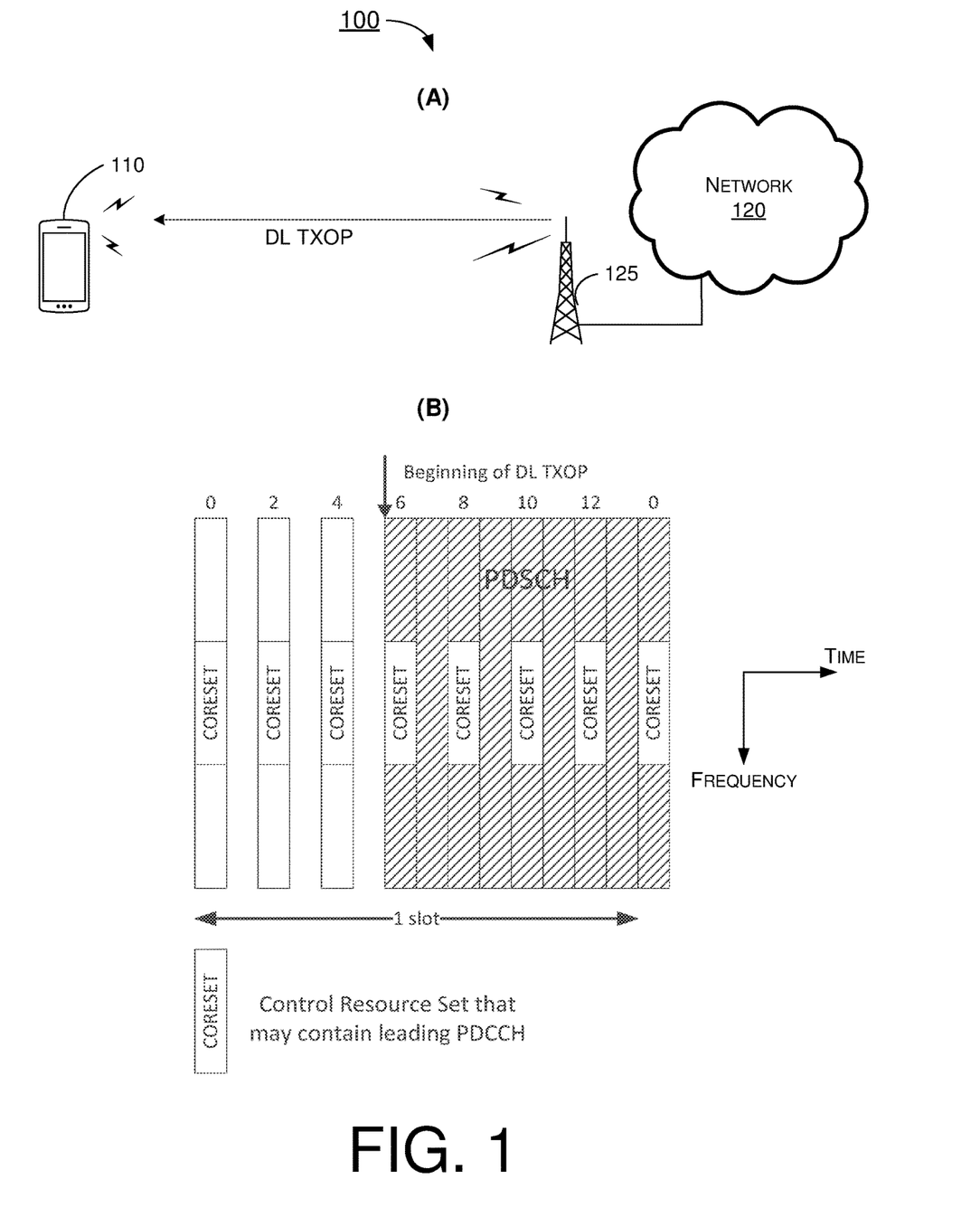
FIG. 1 is a diagram of an example scenario in accordance with an implementation of the present disclosure.

FIG. 1 illustrates an example scenario 100 in accordance with an implementation of the present disclosure. Referring to part (A) of FIG. 1, scenario 100 may involve a user equipment (UE) 110 in wireless communication in NR-U with a wireless network 120 (e.g., a 5th-Generation (5G) NR mobile network) via a base station or network node 125 (e.g., a gNB or transmit-receive point (TRP)). In scenario 100, UE 110 may perform efficient detection of a transmission session in NR-U with wireless network 120 via base station 125 based on one or more of various proposed schemes in accordance with the present disclosure. The follow description of one proposed scheme in accordance with the present disclosure is provided with reference to part (A) and part (B) of FIG. 1. In part (B) of FIG. 1, vertical axis represents frequency domain and horizontal axis represents time domain.

Under a proposed scheme in accordance with the present disclosure, as shown in scenario 100, physical downlink control channel (PDCCH)-based detection may involve frequent monitoring with reduced complexity. Under the proposed scheme, UE 110 may detect the beginning of a DL transmission opportunity (DL TXOP) by detecting the leading PDCCH in a DL TXOP. UE 110 may be configured with a PDCCH monitoring behavior that requires UE 110 to frequently and blindly detect the PDCCH in some but not all of the fourteen OFDM symbols in a given sub-frame or slot. Such configuration may limit the complexity of the blind detection by reducing the search space and/or the bandwidth of the Control Resource Set (CORESET) that contains the PDCCH. For instance, as shown in part (B) of FIG. 1, instead of monitoring every one of the fourteen OFDM symbols, under the proposed scheme UE 110 may monitor every other OFDM symbol among the fourteen OFDM symbols of a given slot to detect the PDCCH in a DL TXOP (e.g., OFDM symbols 0, 2, 4, 6, 8, 10 and 12).

Figure 2:
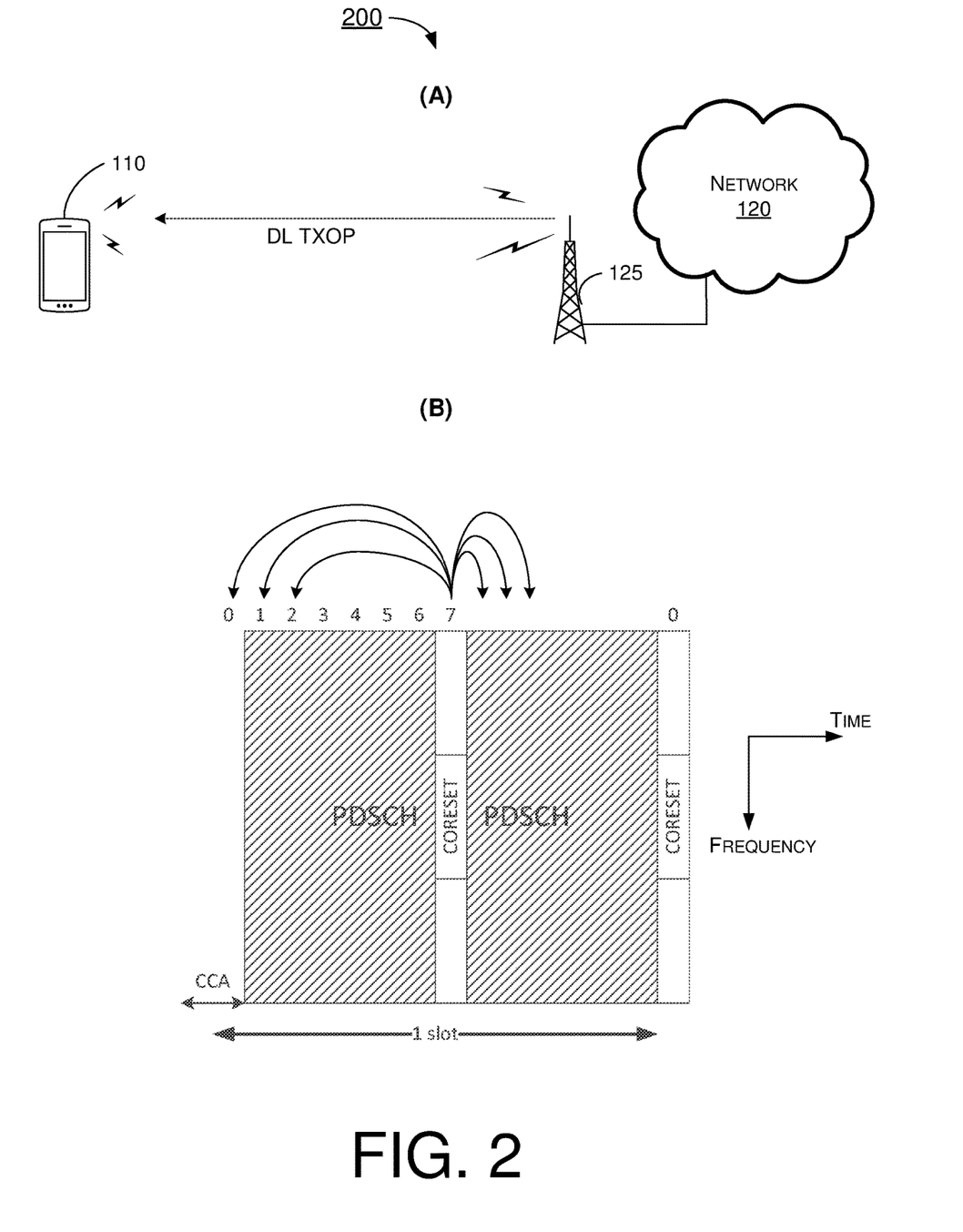
FIG. 2 is a diagram of an example scenario in accordance with an implementation of the present disclosure.

FIG. 2 illustrates an example scenario 200 in accordance with an implementation of the present disclosure. Referring to part (A) of FIG. 2, scenario 200 may involve UE 110 in wireless communication in NR-U with wireless network 120 (e.g., a 5G NR mobile network) via base station or network node 125 (e.g., a gNB or TRP). In scenario 200, UE 110 may perform efficient detection of a transmission session in NR-U with wireless network 120 via base station 125 based on one or more of various proposed schemes in accordance with the present disclosure. The follow description of one proposed scheme in accordance with the present disclosure is provided with reference to part (A) and part (B) of FIG. 2. In part (B) of FIG. 2, vertical axis represents frequency domain and horizontal axis represents time domain.

Under a proposed scheme in accordance with the present disclosure, as shown in scenario 200, PDCCH-based detection may involve back tracking physical downlink shared channel (PDSCH) allocation. Under the proposed scheme, UE 110 may detect the beginning of a DL TXOP by detecting the leading PDCCH in a DL TXOP. UE 110 may be configured with a PDCCH monitoring behavior that requires UE 110 to blindly detect the PDCCH only in a selective few of the fourteen OFDM symbols in a given sub-frame or slot. Under the proposed scheme, PDSCH allocation may start from the earliest symbol of the fourteen OFDM symbols at which a base station is allowed to transmit after LBT. UE 110 may buffer an adequate amount of received signal to decode PDSCH that precedes the leading scheduling PDCCH.

Figure 3:
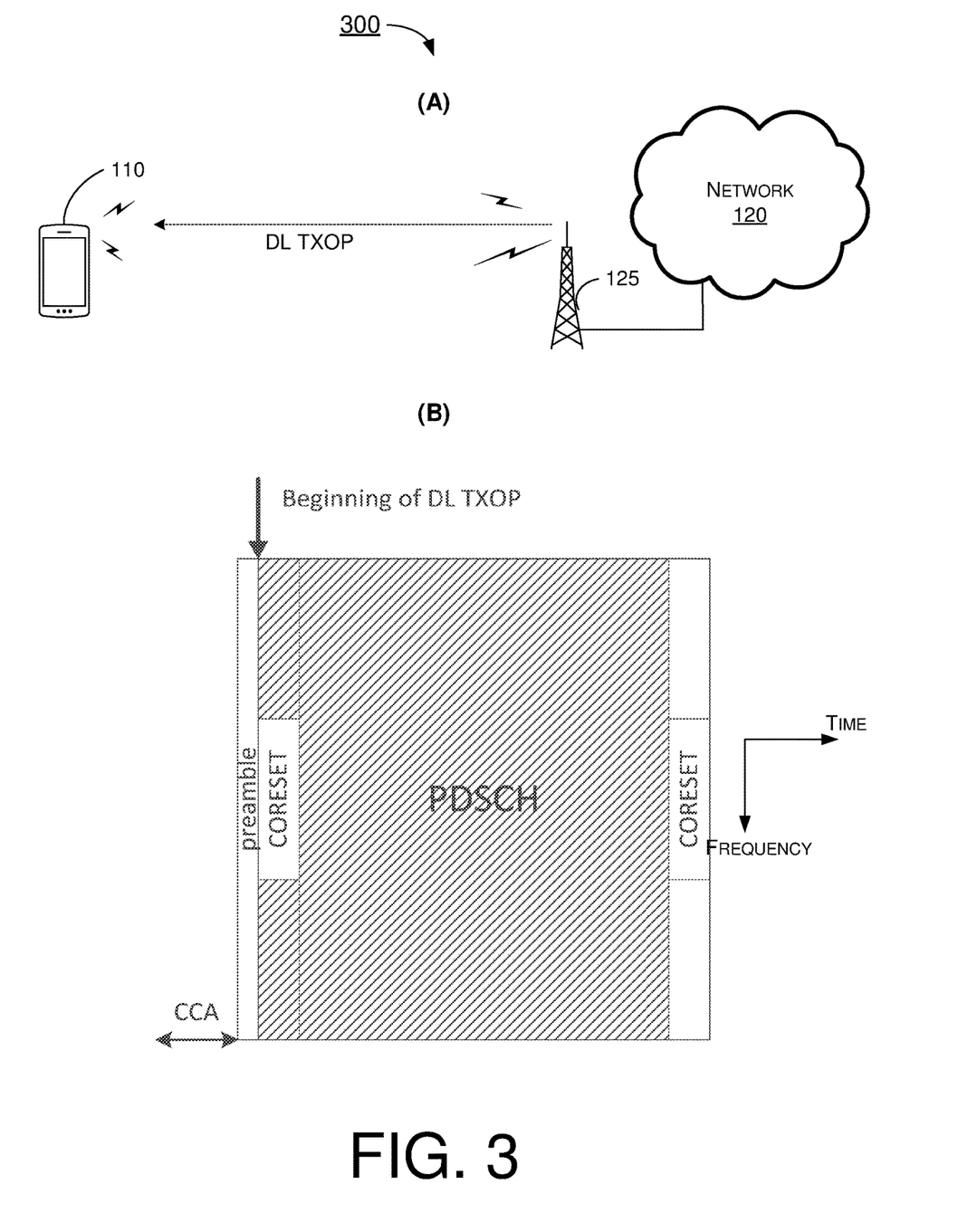
FIG. 3 is a diagram of an example scenario in accordance with an implementation of the present disclosure.

FIG. 3 illustrates an example scenario 300 in accordance with an implementation of the present disclosure. Referring to part (A) of FIG. 3, scenario 300 may involve UE 110 in wireless communication in NR-U with wireless network 120 (e.g., a 5G NR mobile network) via base station or network node 125 (e.g., a gNB or TRP). In scenario 300, UE 110 may perform efficient detection of a transmission session in NR-U with wireless network 120 via base station 125 based on one or more of various proposed schemes in accordance with the present disclosure. The follow description of one proposed scheme in accordance with the present disclosure is provided with reference to part (A) and part (B) of FIG. 3. In part (B) of FIG. 3, vertical axis represents frequency domain and horizontal axis represents time domain.

Under a proposed scheme in accordance with the present disclosure, as shown in scenario 300, preamble-based detection may involve UE 110 to detect the presence of a preamble. Under the proposed scheme, a base station may transmit a preamble preceding a TXOP by an interval known to UE 110 (e.g., 0 when the TXOP immediately follows the preamble). The preamble may be a universal preamble that all base stations use for the same purpose of DL TXOP indication. The preamble may be selected from a set of preambles. For instance, the selection of the preamble may signal the identity of the base station and/or the configuration of the following TXOP.

Figure 4:
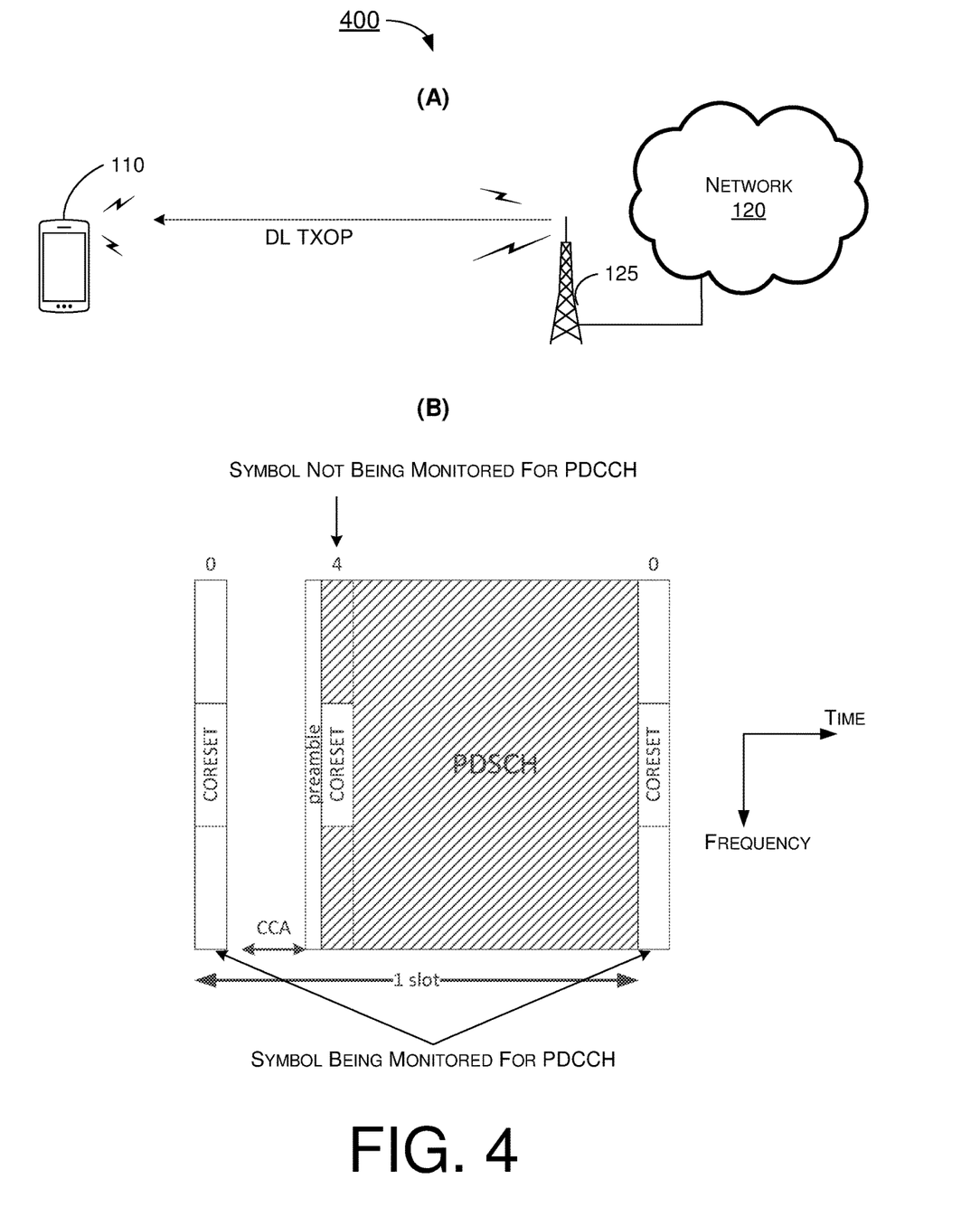
FIG. 4 is a diagram of an example scenario in accordance with an implementation of the present disclosure.

FIG. 4 illustrates an example scenario 400 in accordance with an implementation of the present disclosure. Referring to part (A) of FIG. 4, scenario 400 may involve UE 110 in wireless communication in NR-U with wireless network 120 (e.g., a 5G NR mobile network) via base station or network node 125 (e.g., a gNB or TRP). In scenario 400, UE 110 may perform efficient detection of a transmission session in NR-U with wireless network 120 via base station 125 based on one or more of various proposed schemes in accordance with the present disclosure. The follow description of one proposed scheme in accordance with the present disclosure is provided with reference to part (A) and part (B) of FIG. 4. In part (B) of FIG. 4, vertical axis represents frequency domain and horizontal axis represents time domain.

Under a proposed scheme in accordance with the present disclosure, as shown in scenario 400, a combination of the PDCCH-based detections described above and the preamble-based detection described above may be utilized. In a first approach, the PDCCH-based detections shown in scenario 100 and scenario 200 may be combined. Under the proposed scheme, a combination of PDCCH monitoring with reduced complexity and back tracking of PDSCH scheduling may be performed.

In a second approach, the PDCCH-based detections shown in scenario 100 and scenario 200 may be combined with the preamble-based detection shown in scenario 300. Under the proposed scheme, in an event that DL TXOP starts at a symbol being monitored for PDCCH, no preamble may be transmitted. Additionally, in an event that DL TXOP starts at a symbol not being monitored for PDCCH, a preamble may be transmitted preceding the DL TXOP. Under the proposed scheme, UE 110 may perform preamble-based detection in symbols not being monitored for PDCCH. Moreover, UE 110 may perform PDCCH-based detection in symbols being monitored for PDCCH.

Figure 5:
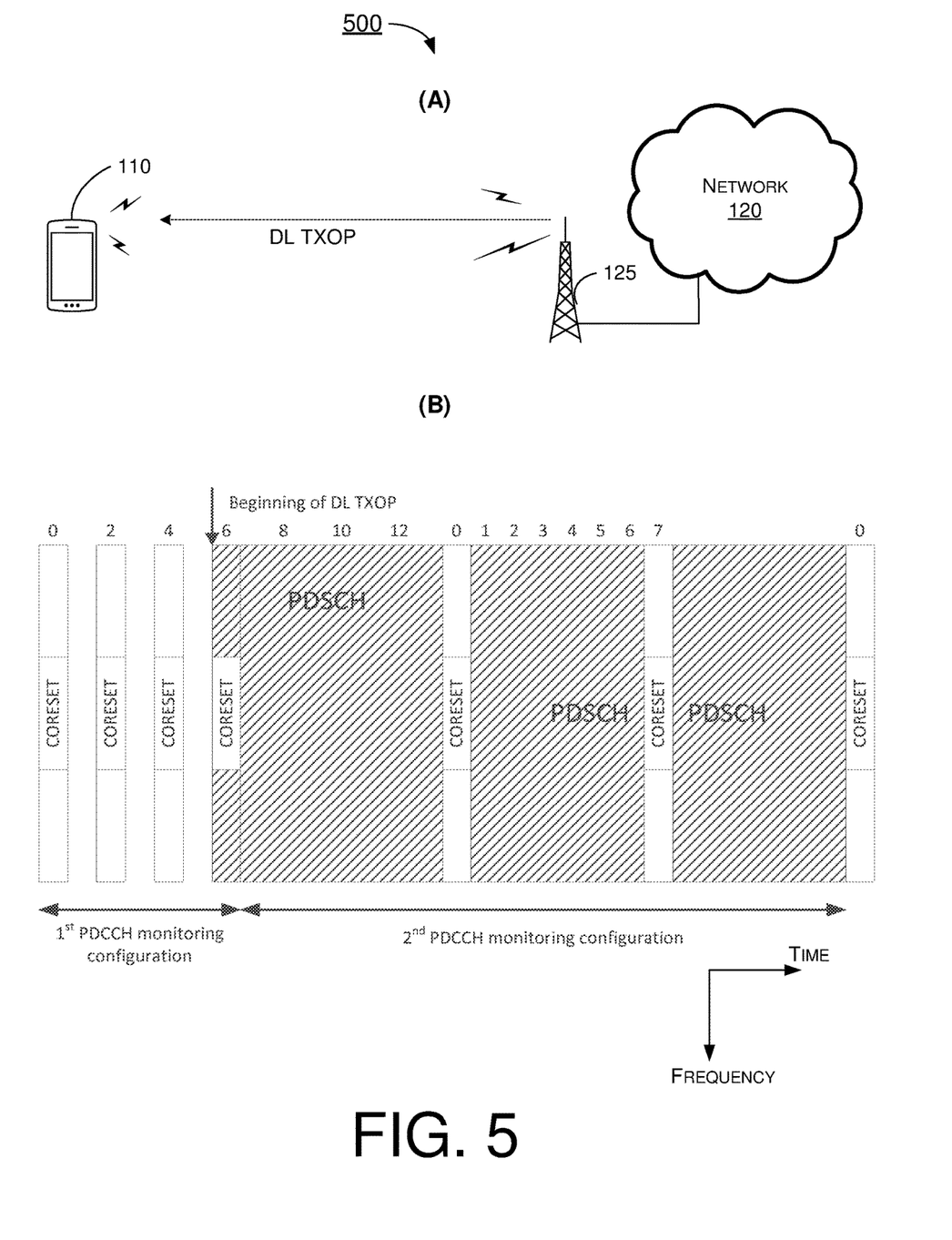
FIG. 5 is a diagram of an example scenario in accordance with an implementation of the present disclosure.

FIG. 5 illustrates an example scenario 500 in accordance with an implementation of the present disclosure. Referring to part (A) of FIG. 5, scenario 500 may involve UE 110 in wireless communication in NR-U with wireless network 120 (e.g., a 5G NR mobile network) via base station or network node 125 (e.g., a gNB or TRP). In scenario 500, UE 110 may perform efficient detection of a transmission session in NR-U with wireless network 120 via base station 125 based on one or more of various proposed schemes in accordance with the present disclosure. The follow description of one proposed scheme in accordance with the present disclosure is provided with reference to part (A) and part (B) of FIG. 5. In part (B) of FIG. 5, vertical axis represents frequency domain and horizontal axis represents time domain.

Under a proposed scheme in accordance with the present disclosure, as shown in scenario 500, with respect to different PDCCH monitoring behaviors before and after detection of DL TXOP, UE 110 may be configured with a first PDCH monitoring behavior during a phase of detection of the beginning of a DL TXOP. Moreover, under the proposed scheme, UE 110 may be configured with a second PDCCH monitoring behavior after the detection of the beginning of a DL transmission. The configuration of the second PDCCH monitoring behavior may be pre-configured along with the configuration of the first PDCCH monitoring behavior. The second PDCCH monitoring behavior may be configured after the detection of the beginning of a DL transmission. Under the proposed scheme, the second PDCCH monitoring behavior may be configured via a radio resource control (RRC) configuration in the detected DL TXOP. Alternatively, the second PDCCH monitoring behavior may be configured via the PDCCH in the detected DL-TXOOP. For instance, the PDCCH carrying the configuration of the second PDCCH monitoring behavior may be the leading PDCCH in the detected DL TXOP.

Under a proposed scheme in accordance with the present disclosure, with respect to configuration of PDCCH monitoring behaviors, the configuration of the first PDCCH monitoring behavior as described above may include a first set of CORESET configurations and a first set of search space configurations. For the configuration of the second PDCCH monitoring behavior as described above, one of several approaches may be used. In a first approach, the configuration of the second PDCCH monitoring behavior may include a second set of CORESET configurations and a second set of search space configurations. In a second approach, the configuration of the second PDCCH monitoring behavior may include a second set of search space configurations. In such cases, the first set of CORESET configurations of the first PDCCH monitoring behavior may be applied to or otherwise utilized for the second PDCCH monitoring behavior. In a third approach, the configuration of the second PDCCH monitoring behavior may include a second set of CORESET configurations. In such cases, the first set of search space configurations of the first PDCCH monitoring behavior may be applied to or otherwise utilized for the second PDCCH monitoring behavior.

Under a proposed scheme in accordance with the present disclosure, with respect to UE behavior, based on the configuration of the first PDCCH monitoring behavior, UE 110 may detect the beginning of a TXOP by using one of several approaches. In a first approach, UE 110 may monitor group common PDCCH. In an event that the cyclic redundancy check (CRC) of group common PDCCH passes, the TXOP may be detected by UE 110. Otherwise, UE 110 may monitor group common PDCCH in the next opportunity. In a second approach, UE 110 may detect the demodulation reference signal (DMRS) of the group common PDCCH. In an event that the PDCCH DMRS is detected, UE 110 may perform blind decode for group common PDCCH. In an event that the CRC of group common PDCCH passes, the TXOP may be detected by UE 110. Otherwise, UE 110 may detect the DMRS in the next opportunity. In a third approach, UE 110 may detect the preamble preceding the TXOP. In an event that the preamble is detected, UE 110 may perform blind decode for group common PDCCH. In an event that that CRC of group common PDCCH passes, the TXOP may be detected by UE 110. Otherwise, UE 110 may detect the preamble in the next opportunity. Under the proposed scheme, once the beginning of a TXOP is detected, UE 110 may start to monitor other PDCCHs based on the configuration of the second PDCCH monitoring behavior described above.

Under a proposed scheme in accordance with the present disclosure, with respect to CORESET configurations, the resource element group (REG) bundle size of the first set of CORESET configurations may be larger than or equal to the REG bundle size of the second set of CORESET configurations. For example, the REG bundle size of the first set of CORESET configurations may be the whole REGs. Additionally, the REG bundle size of the second set of CORESET configurations may be two, three or six. Under the proposed scheme, the duration of the first set of CORESET configurations may be shorter than or equal to the duration of the second set of CORESET configurations. For example, the duration of the first set of CORESET configurations may be one. Additionally, the duration of the second set of CORESET configurations may be one, two or three. Under the proposed scheme, the bandwidth of the first set of CORESET configurations may be smaller than or equal to the bandwidth of the second set of CORESET configurations.

Under a proposed scheme in accordance with the present disclosure, with respect to search space configurations, the monitoring periodicity of the first set of search space configurations as described above may be shorter than or equal to the monitoring periodicity of the second set of search space configurations as described above. Under the proposed scheme, the PDCCH monitoring pattern of the first set of search space configurations may be denser than or equal to the PDCCH monitoring pattern of the second set of search space configurations. Under the proposed scheme, the total number of PDCCH candidates of the first set of search space configurations may be smaller than or equal to the total number of PDCCH candidates of the second set of search space configurations. Under the proposed scheme, for the first set of search space configurations, one (and not more than one) aggregation level with non-zero PDCCH candidate may be configured for the group common PDCCH. For instance, the number of PDCCH candidates may be one.

Figure 6:
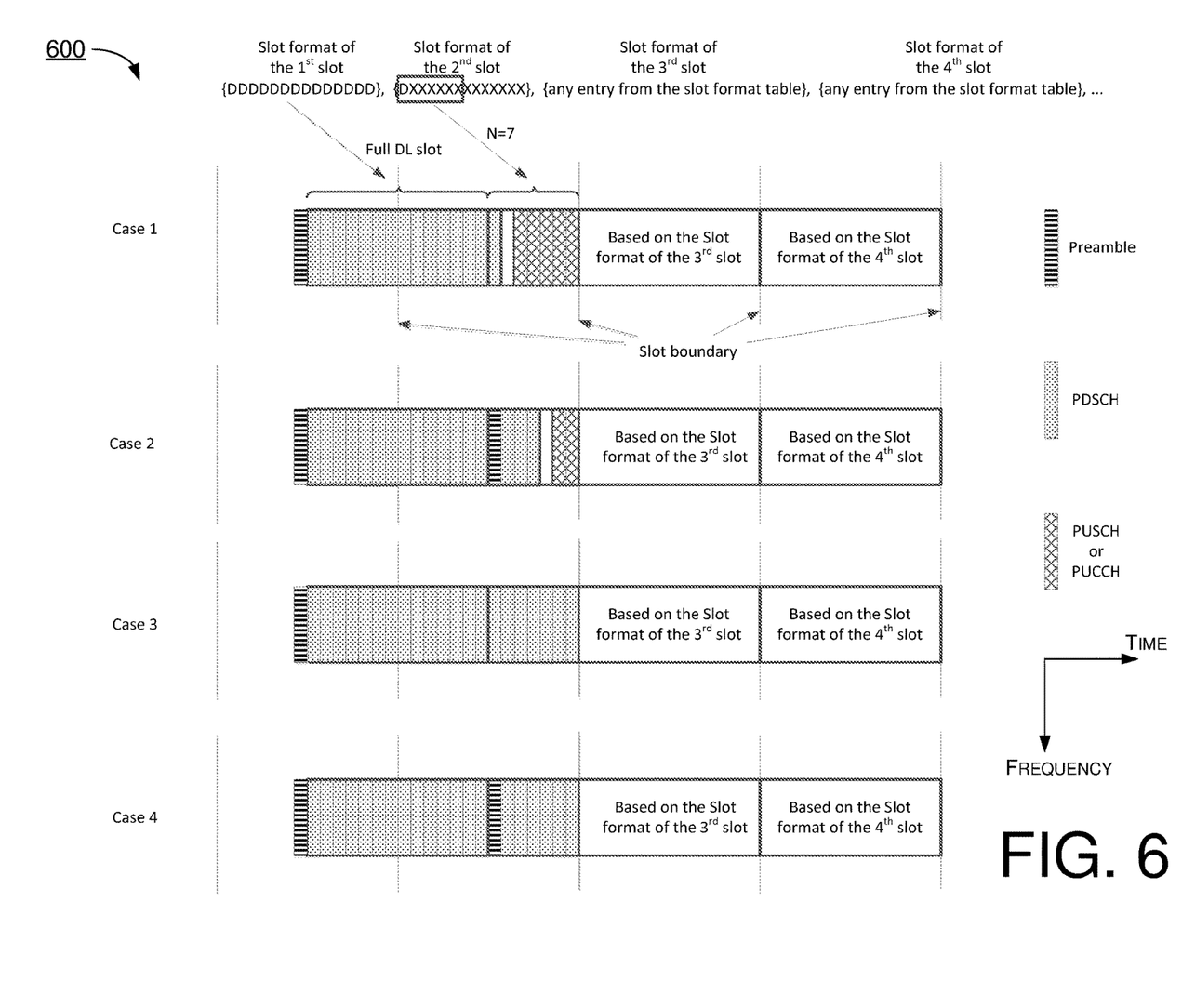
FIG. 6 is a diagram of an example scenario in accordance with an implementation of the present disclosure.

FIG. 6 illustrates an example scenario 600 in accordance with an implementation of the present disclosure. In FIG. 6, vertical axis represents frequency domain and horizontal axis represents time domain. Under a proposed scheme in accordance with the present disclosure, as shown in scenario 600, with respect to TXOP with PDSCH transmission, slot format indication (SFI) may be carried in the group common PDCCH for NR-U. For instance, the first slot may be scheduled as a full DL transmission by a base station (e.g., gNB). Moreover, the second slot may start from one or multiple DL symbols and end with flexible symbol(s). Under the proposed scheme, the transmission direction of the first fourteen OFDM symbols may be in the DL direction. In an event that the starting slot is a partial slot, the transmission direction of the remaining OFDM symbols in the second slot (which does not belong to the first fourteen OFDM symbols of the TXOP) may be determined based on the slot format of the second slot. Under the proposed scheme, a UE (e.g., UE 110) may follow the first N transmission directions from the slot format, where N is the number of OFDM symbols in the second slot that does not belong to the first fourteen OFDM symbols of the TXOP. For instance, given that the slot format of the second slot is {DXXXXXXXXXXXXX} and N=7, then the slot format of OFDM symbol 7, 8, 9, 10, 11, 12, 13 in the second slot may be {DXXXXXX}.

Illustrative Implementations

Figure 7:
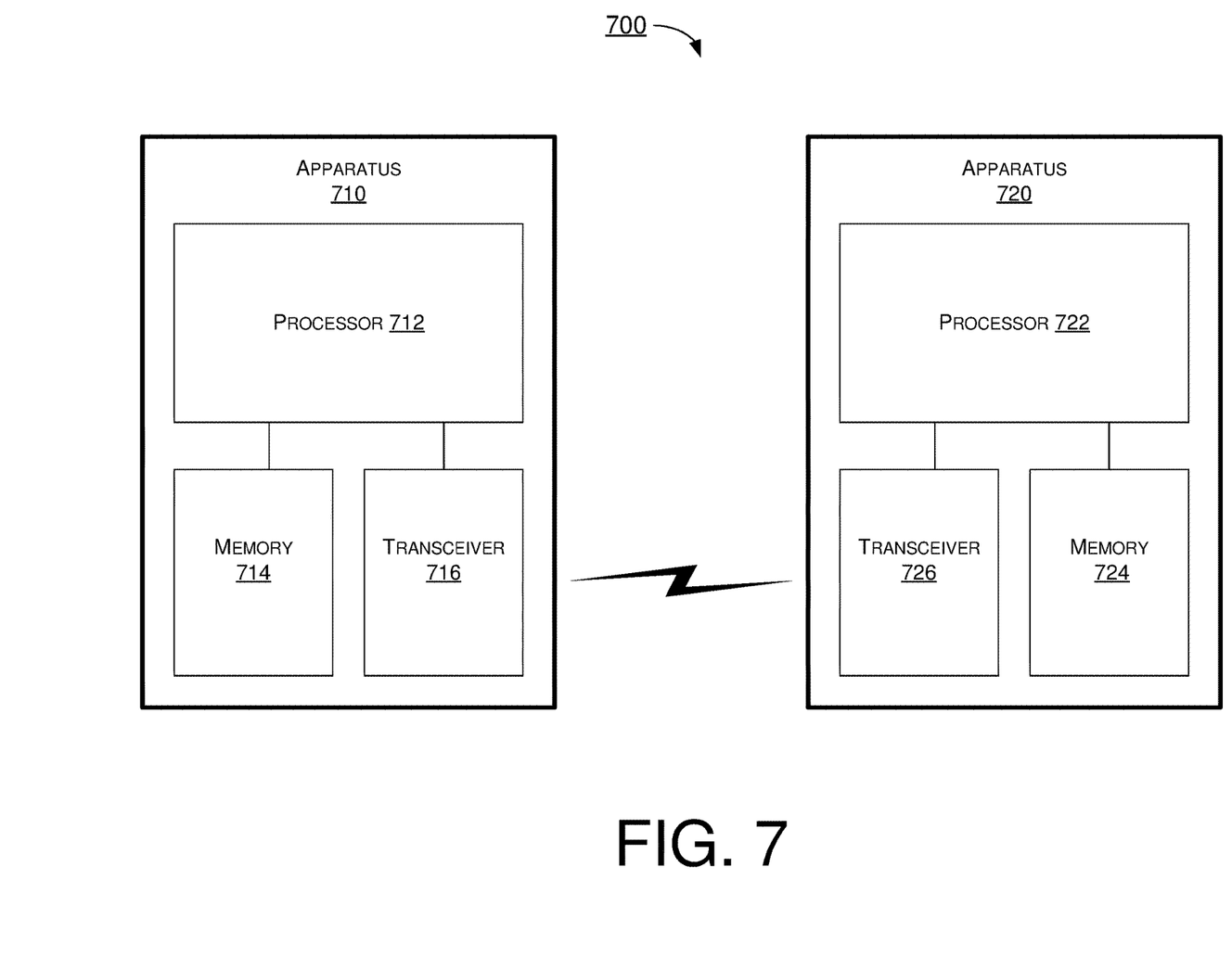
FIG. 7 is a block diagram of an example system in accordance with an implementation of the present disclosure.

FIG. 7 illustrates an example system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to efficient detection of a transmission session in NR-U, including the various schemes described above with respect to various proposed designs, concepts, schemes, systems and methods described above as well as process 700 described below. For instance, apparatus 710 may be an example implementation of UE 110, and apparatus 720 may be an example implementation of base station 125.

Each of apparatus 710 and apparatus 720 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 710 and apparatus 720 may be implemented in a smartphone, a smart watch, a personal digital assistant, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in a base station (e.g., base station 125), such as an eNB in an LTE, LTE-Advanced or LTE-Advanced Pro network or in a gNB or TRP in a 5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to efficient detection of a transmission session in NR-U in accordance with various implementations of the present disclosure.

In some implementations, apparatus 710 may also include a transceiver 716 coupled to processor 712. Transceiver 716 may be capable of wirelessly transmitting and receiving data. In some implementations, apparatus 720 may also include a transceiver 726 coupled to processor 722. Transceiver 726 may include a transceiver capable of wirelessly transmitting and receiving data.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE, and apparatus 720, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 710 as a UE (e.g., UE 110), the same is also applicable to apparatus 720 as a network node or base station such as a gNB, TRP or eNodeB (e.g., base station 125) of a wireless network (e.g., wireless network 120) such as a 5G NR mobile network.

Under a proposed scheme with respect to efficient detection of a transmission session in NR-U in accordance with the present disclosure, processor 712 of apparatus 710 may detect, via transceiver 716, presence of an indication from apparatus 720 in an NR-U. Moreover, processor 712 may determine that a TXOP follows the indication in time responsive to the detecting. Furthermore, processor 712 may receive, via transceiver 716, a DL transmission in the NR-U from apparatus 720 during the TXOP.

In some implementations, the indication may include a preamble. In some implementations, the preamble may include a universal preamble used by a plurality of base stations of the wireless network for a same purpose of indicating a DL TXOP. In some implementations, the preamble may indicate an identity of apparatus 720, a configuration of the TXOP, or both.

In some implementations, processor 712 may also monitor, via transceiver 716, some but not all of a plurality of OFDM symbols in each slot to detect a leading PDCCH in a DL TXOP.

In some implementations, in monitoring some but not all of the plurality of OFDM symbols in each slot, processor 712 may monitor half of the plurality of OFDM symbols in each slot by monitoring every other OFDM symbol of the plurality of OFDM symbols in each slot.

In some implementations, in monitoring, processor 712 may perform some operations. For instance, processor 712 may monitor according to a first PDCCH monitoring behavior during a phase of detection of a beginning of the DL TXOP. Moreover, processor 712 may monitor according to a second PDCCH monitoring behavior after the phase of detection of the beginning of the DL TXOP, with the second PDCCH monitoring behavior being different from the first PDCCH monitoring behavior.

In some implementations, the second PDCCH monitoring behavior may be pre-configured or configured after the phase of detection of the beginning of the DL TXOP. Accordingly, in an event that the second PDCCH monitoring behavior is configured after the phase of detection of the beginning of the DL TXOP, the second PDCCH monitoring behavior may be configured via radio resource control (RRC) signaling or via a PDCCH in a detected DL TXOP.

In some implementations, the first PDCCH monitoring behavior may include a first set of control resource set (CORESET) configurations and a first set of search space configurations. Additionally, the second PDCCH monitoring behavior may include one of the following three options: (i) a second set of CORESET configurations, which is different from the first set of CORESET configurations, and a second set of search space configurations, which is different from the first set of search space configurations; (ii) the first set of CORESET configurations and the second set of search space configurations; or (iii) the second set of CORESET configurations and the first set of search space configurations.

In some implementations, a resource element group (REG) size of the first set of CORESET configurations may be larger than or equal to a REG size of the second set of CORESET configurations. Additionally, a duration of the first set of CORESET configurations may be shorter than or equal to a duration of the second set of CORESET configurations. Moreover, a bandwidth of the first set of CORESET configurations may be smaller than or equal to a bandwidth of the second set of CORESET configurations.

In some implementations, a monitoring periodicity of the first set of search space configurations may be shorter than or equal to a monitoring periodicity of the second set of search space configurations. Moreover, a PDCCH monitoring pattern of the first set of search space configurations may be denser than or equal to a PDCCH monitoring pattern of the second set of search space configurations. Furthermore, a total number of PDCCH candidates of the first set of search space configurations may be smaller than or equal to a total number of PDCCH candidates of the second set of search space configurations.

In some implementations, in monitoring to detect the leading PDCCH according to the first PDCCH monitoring behavior, process 800 may involve processor 712 detecting a beginning of a TXOP by performing one of the following: (i) monitoring a group common PDCCH; (ii) detecting a demodulation reference signal (DMRS) of the group common PDCCH; or (iii) detecting a preamble preceding the TXOP.

In some implementations, processor 712 may monitor, via transceiver 716, to detect a leading PDCCH in a DL TXOP. For instance, processor 712 may buffer packets of an amount of received signal. Additionally, processor 712 may decode a PDSCH in the buffered packets, with the PDSCH preceding the leading PDCCH.

In some implementations, in monitoring, processor 712 may perform some operations. For instance, processor 712 may monitor according to a first PDCCH monitoring behavior during a phase of detection of a beginning of the DL TXOP. Moreover, processor 712 may monitor according to a second PDCCH monitoring behavior after the phase of detection of the beginning of the DL TXOP, with the second PDCCH monitoring behavior being different from the first PDCCH monitoring behavior.

In some implementations, the second PDCCH monitoring behavior may be pre-configured or configured after the phase of detection of the beginning of the DL TXOP. Accordingly, in an event that the second PDCCH monitoring behavior is configured after the phase of detection of the beginning of the DL TXOP, the second PDCCH monitoring behavior may be configured via RRC signaling or via a PDCCH in a detected DL TXOP.

In some implementations, the first PDCCH monitoring behavior may include a first set of CORESET configurations and a first set of search space configurations. Additionally, the second PDCCH monitoring behavior may include one of the following: (i) a second set of CORESET configurations, which is different from the first set of CORESET configurations, and a second set of search space configurations, which is different from the first set of search space configurations; (ii) the first set of CORESET configurations and the second set of search space configurations; or (iii) the second set of CORESET configurations and the first set of search space configurations.

In some implementations, a REG size of the first set of CORESET configurations may be larger than or equal to a REG size of the second set of CORESET configurations. Additionally, a duration of the first set of CORESET configurations may be shorter than or equal to a duration of the second set of CORESET configurations. Moreover, a bandwidth of the first set of CORESET configurations may be smaller than or equal to a bandwidth of the second set of CORESET configurations.

In some implementations, a monitoring periodicity of the first set of search space configurations may be shorter than or equal to a monitoring periodicity of the second set of search space configurations. Moreover, a PDCCH monitoring pattern of the first set of search space configurations may be denser than or equal to a PDCCH monitoring pattern of the second set of search space configurations. Furthermore, a total number of PDCCH candidates of the first set of search space configurations may be smaller than or equal to a total number of PDCCH candidates of the second set of search space configurations.

In some implementations, in monitoring to detect the leading PDCCH according to the first PDCCH monitoring behavior, process 800 may involve processor 712 detecting a beginning of a TXOP by performing one of the following: (i) monitoring a group common PDCCH; (ii) detecting a demodulation reference signal (DMRS) of the group common PDCCH; or (iii) detecting a preamble preceding the TXOP.

Under another proposed scheme with respect to efficient detection of a transmission session in NR-U in accordance with the present disclosure, processor 712 of apparatus 710 may detect, via transceiver 716, a leading PDCCH in a DL TXOP from apparatus 720 in an NR-U. Additionally, processor 712 may receive, via transceiver 716, a DL transmission in the NR-U from apparatus 720 during the DL TXOP.

In some implementations, in detecting the leading PDCCH in a DL TXOP, processor 712 may perform either a first operation or a second operation. The first operation may involve processor 712 monitoring some but not all of a plurality of OFDM symbols in each slot. The second operation may involve processor 712 performing: (a) buffering packets of an amount of received signal; and (b) decoding a PDSCH in the buffered packets, with the PDSCH preceding the leading PDCCH.

Illustrative Processes

Figure 8:
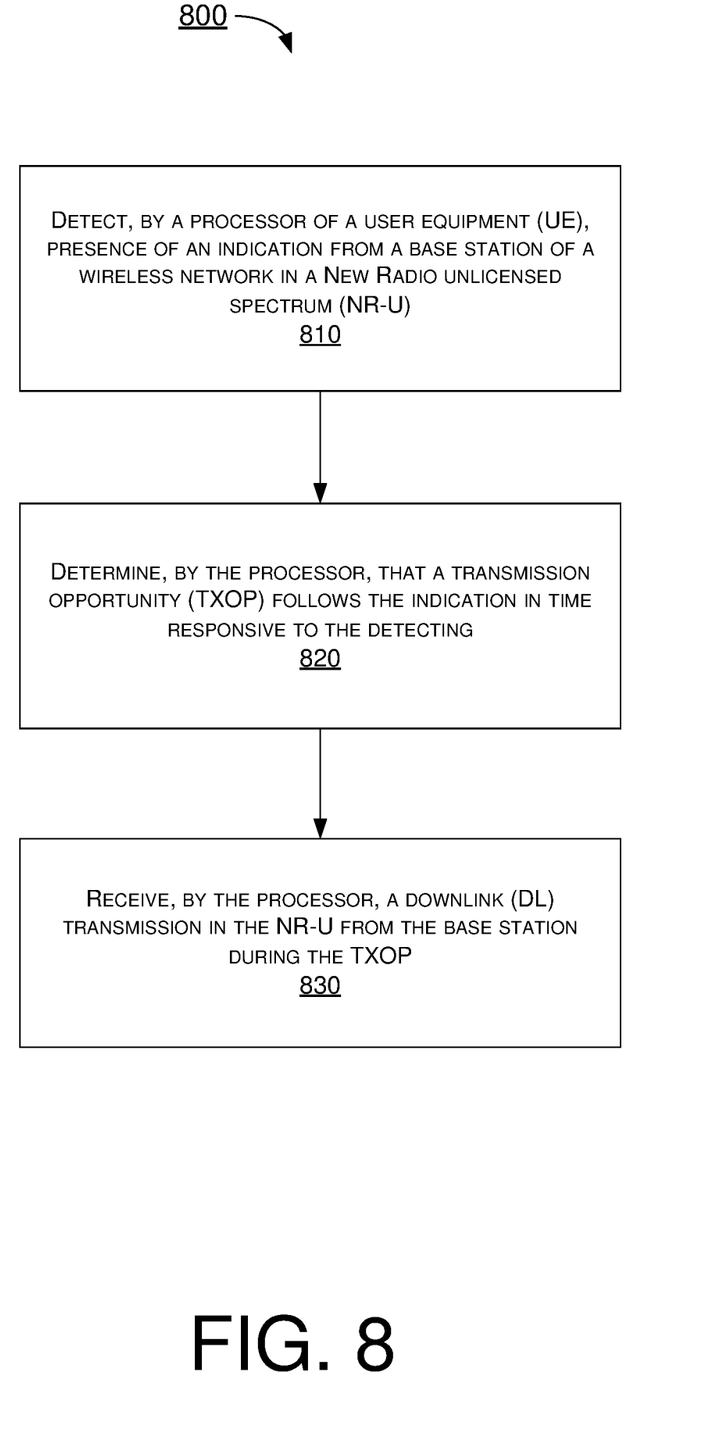
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to efficient detection of a transmission session in NR-U. Process 800 may include one or more operations, actions, or functions as illustrated by one or more of blocks 810, 820 and 830. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 710 and apparatus 720 as well as any variations thereof. Solely for illustrative purposes and without limiting the scope, process 800 is described below in the context of apparatus 710 as a UE (e.g., UE 110) and apparatus 720 as a base station (e.g., base station 125) of a wireless network (e.g., wireless network 120) such as a 5G/NR mobile network. Process 800 may begin at block 810.

At 810, process 800 may involve processor 712 of apparatus 710 detecting, via transceiver 716, presence of an indication from apparatus 720 in an NR-U. Process 800 may proceed from 810 to 820.

At 820, process 800 may involve processor 712 determining that a TXOP follows the indication in time responsive to the detecting. Process 800 may proceed from 820 to 830.

At 830, process 800 may involve processor 712 receiving, via transceiver 716, a DL transmission in the NR-U from apparatus 720 during the TXOP.

In some implementations, the indication may include a preamble. In some implementations, the preamble may include a universal preamble used by a plurality of base stations of the wireless network for a same purpose of indicating a DL TXOP. In some implementations, the preamble may indicate an identity of apparatus 720, a configuration of the TXOP, or both.

In some implementations, process 800 may further involve processor 712 monitoring, via transceiver 716, some but not all of a plurality of OFDM symbols in each slot to detect a leading PDCCH in a DL TXOP.

In some implementations, in monitoring some but not all of the plurality of OFDM symbols in each slot, process 800 may involve processor 712 monitoring half of the plurality of OFDM symbols in each slot by monitoring every other OFDM symbol of the plurality of OFDM symbols in each slot.

In some implementations, in monitoring, process 800 may involve processor 712 performing some operations. For instance, process 800 may involve processor 712 monitoring according to a first PDCCH monitoring behavior during a phase of detection of a beginning of the DL TXOP. Moreover, process 800 may involve processor 712 monitoring according to a second PDCCH monitoring behavior after the phase of detection of the beginning of the DL TXOP, with the second PDCCH monitoring behavior being different from the first PDCCH monitoring behavior.

In some implementations, the second PDCCH monitoring behavior may be pre-configured or configured after the phase of detection of the beginning of the DL TXOP. Accordingly, in an event that the second PDCCH monitoring behavior is configured after the phase of detection of the beginning of the DL TXOP, the second PDCCH monitoring behavior may be configured via radio resource control (RRC) signaling or via a PDCCH in a detected DL TXOP.

In some implementations, the first PDCCH monitoring behavior may include a first set of control resource set (CORESET) configurations and a first set of search space configurations. Additionally, the second PDCCH monitoring behavior may include one of the following three options: (i) a second set of CORESET configurations, which is different from the first set of CORESET configurations, and a second set of search space configurations, which is different from the first set of search space configurations; (ii) the first set of CORESET configurations and the second set of search space configurations; or (iii) the second set of CORESET configurations and the first set of search space configurations.

In some implementations, a resource element group (REG) size of the first set of CORESET configurations may be larger than or equal to a REG size of the second set of CORESET configurations. Additionally, a duration of the first set of CORESET configurations may be shorter than or equal to a duration of the second set of CORESET configurations. Moreover, a bandwidth of the first set of CORESET configurations may be smaller than or equal to a bandwidth of the second set of CORESET configurations.

In some implementations, a monitoring periodicity of the first set of search space configurations may be shorter than or equal to a monitoring periodicity of the second set of search space configurations. Moreover, a PDCCH monitoring pattern of the first set of search space configurations may be denser than or equal to a PDCCH monitoring pattern of the second set of search space configurations. Furthermore, a total number of PDCCH candidates of the first set of search space configurations may be smaller than or equal to a total number of PDCCH candidates of the second set of search space configurations.

In some implementations, in monitoring to detect the leading PDCCH according to the first PDCCH monitoring behavior, process 800 may involve processor 712 detecting a beginning of a TXOP by performing one of the following:

(i) monitoring a group common PDCCH; (ii) detecting a demodulation reference signal (DMRS) of the group common PDCCH; or (iii) detecting a preamble preceding the TXOP.

In some implementations, process 800 may further involve processor 712 monitoring, via transceiver 716, to detect a leading PDCCH in a DL TXOP. For instance, process 800 may involve processor 712 buffering packets of an amount of received signal. Additionally, process 800 may involve processor 712 decoding a PDSCH in the buffered packets, with the PDSCH preceding the leading PDCCH.

In some implementations, in monitoring, process 800 may involve processor 712 performing some operations. For instance, process 800 may involve processor 712 monitoring according to a first PDCCH monitoring behavior during a phase of detection of a beginning of the DL TXOP. Moreover, process 800 may involve processor 712 monitoring according to a second PDCCH monitoring behavior after the phase of detection of the beginning of the DL TXOP, with the second PDCCH monitoring behavior being different from the first PDCCH monitoring behavior.

In some implementations, the second PDCCH monitoring behavior may be pre-configured or configured after the phase of detection of the beginning of the DL TXOP. Accordingly, in an event that the second PDCCH monitoring behavior is configured after the phase of detection of the beginning of the DL TXOP, the second PDCCH monitoring behavior may be configured via RRC signaling or via a PDCCH in a detected DL TXOP.

In some implementations, the first PDCCH monitoring behavior may include a first set of CORESET configurations and a first set of search space configurations. Additionally, the second PDCCH monitoring behavior may include one of the following: (i) a second set of CORESET configurations, which is different from the first set of CORESET configurations, and a second set of search space configurations, which is different from the first set of search space configurations; (ii) the first set of CORESET configurations and the second set of search space configurations; or (iii) the second set of CORESET configurations and the first set of search space configurations.

In some implementations, a REG size of the first set of CORESET configurations may be larger than or equal to a REG size of the second set of CORESET configurations. Additionally, a duration of the first set of CORESET configurations may be shorter than or equal to a duration of the second set of CORESET configurations. Moreover, a bandwidth of the first set of CORESET configurations may be smaller than or equal to a bandwidth of the second set of CORESET configurations.

In some implementations, a monitoring periodicity of the first set of search space configurations may be shorter than or equal to a monitoring periodicity of the second set of search space configurations. Moreover, a PDCCH monitoring pattern of the first set of search space configurations may be denser than or equal to a PDCCH monitoring pattern of the second set of search space configurations. Furthermore, a total number of PDCCH candidates of the first set of search space configurations may be smaller than or equal to a total number of PDCCH candidates of the second set of search space configurations.

In some implementations, in monitoring to detect the leading PDCCH according to the first PDCCH monitoring behavior, process 800 may involve processor 712 detecting a beginning of a TXOP by performing one of the following: (i) monitoring a group common PDCCH; (ii) detecting a demodulation reference signal (DMRS) of the group common PDCCH; or (iii) detecting a preamble preceding the TXOP.

Figure 9:
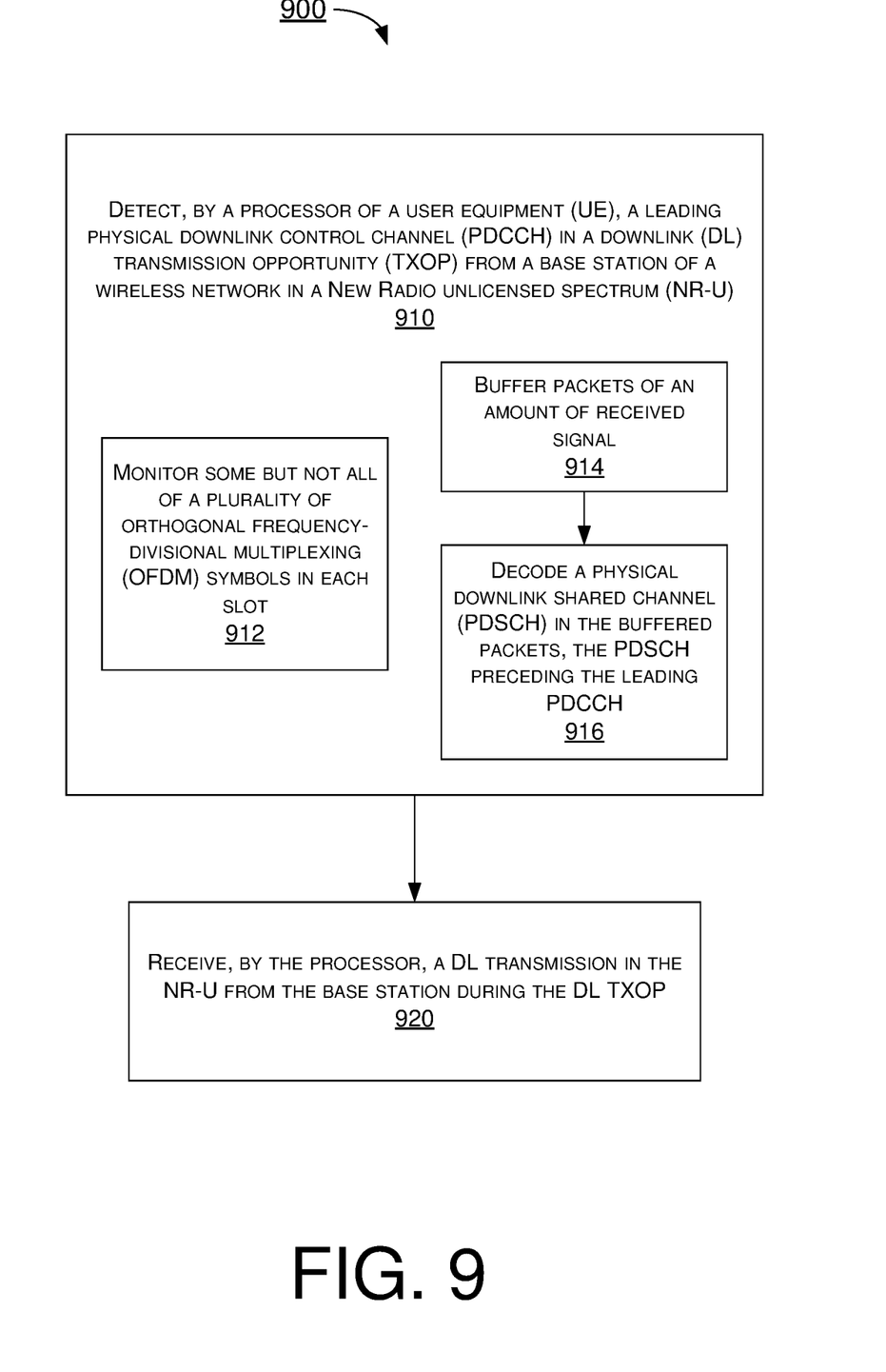
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to efficient detection of a transmission session in NR-U. Process 900 may include one or more operations, actions, or functions as illustrated by one or more of blocks 910 and 920 as well as sub-blocks 912, 914 and 916. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 710 and apparatus 720 as well as any variations thereof. Solely for illustrative purposes and without limiting the scope, process 900 is described below in the context of apparatus 710 as a UE (e.g., UE 110) and apparatus 720 as a base station (e.g., base station 125) of a wireless network (e.g., wireless network 120) such as a 5G/NR mobile network. Process 900 may begin at block 910.

At 910, process 900 may involve processor 712 of apparatus 710 detecting, via transceiver 716, a leading PDCCH in a DL TXOP from apparatus 720 in an NR-U. Process 900 may proceed from 910 to 920.

At 920, process 900 may involve processor 712 receiving, via transceiver 716, a DL transmission in the NR-U from apparatus 720 during the DL TXOP.

In some implementations, in detecting the leading PDCCH in a DL TXOP, process 900 may involve processor 712 performing either a first operation or a second operation, with the first operation represented by 912 and the second operation represented by 914 and 916.

At 912, process 900 may involve processor 712 monitoring some but not all of a plurality of OFDM symbols in each slot.

At 914, process 900 may involve processor 712 buffering packets of an amount of received signal. Process 900 may proceed from 914 to 916.

At 916, process 900 may involve processor 712 decoding a PDSCH in the buffered packets, with the PDSCH preceding the leading PDCCH.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  detecting, by a processor of a user equipment (UE), presence of an indication from a base station of a wireless network in a New Radio unlicensed spectrum (NR-U);
  determining, by the processor, that a transmission opportunity (TXOP) follows the indication responsive to the detecting;
  receiving, by the processor, a downlink (DL) transmission in the NR-U from the base station during the TXOP;
  detecting, by the processor, a leading physical downlink control channel (PDCCH) in a DL TXOP,
  wherein the detecting comprises:
    monitoring according to a first PDCCH monitoring behavior during a phase of detection of a beginning of the DL TXOP; and
    monitoring according to a second PDCCH monitoring behavior after the phase of detection of the beginning of the DL TXOP, the second PDCCH monitoring behavior being different from the first PDCCH monitoring behavior.

2. The method of claim 1, wherein the indication comprises a preamble.

3. The method of claim 2, wherein the preamble comprises a universal preamble used by a plurality of base stations of the wireless network for a same purpose of indicating a DL TXOP.

4. The method of claim 2, wherein the preamble indicates an identity of the base station, a configuration of the TXOP, or both.

5. The method of claim 1, wherein the second PDCCH monitoring behavior is pre-configured or configured after the phase of detection of the beginning of the DL TXOP, and wherein, in an event that the second PDCCH monitoring behavior is configured after the phase of detection of the beginning of the DL TXOP, the second PDCCH monitoring behavior is configured via radio resource control (RRC) signaling or via a PDCCH in a detected DL TXOP.

6. The method of claim 1, wherein the first PDCCH monitoring behavior comprises a first set of control resource set (CORESET) configurations and a first set of search space configurations, and wherein the second PDCCH monitoring behavior comprises one of:
  a second set of CORESET configurations, which is different from the first set of CORESET configurations, and a second set of search space configurations, which is different from the first set of search space configurations;
  the first set of CORESET configurations and the second set of search space configurations; or
  the second set of CORESET configurations and the first set of search space configurations.

7. The method of claim 6, wherein a resource element group (REG) size of the first set of CORESET configurations is larger than or equal to a REG size of the second set of CORESET configurations, wherein a duration of the first set of CORESET configurations is shorter than or equal to a duration of the second set of CORESET configurations, and wherein a bandwidth of the first set of CORESET configurations is smaller than or equal to a bandwidth of the second set of CORESET configurations.

8. The method of claim 6, wherein a monitoring periodicity of the first set of search space configurations is shorter than or equal to a monitoring periodicity of the second set of search space configurations, wherein a PDCCH monitoring pattern of the first set of search space configurations is denser than or equal to a PDCCH monitoring pattern of the second set of search space configurations, and wherein a total number of PDCCH candidates of the first set of search space configurations is smaller than or equal to a total number of PDCCH candidates of the second set of search space configurations.

9. The method of claim 1, wherein the monitoring to detect the leading PDCCH according to the first PDCCH monitoring behavior comprises detecting a beginning of a TXOP by performing one of:
monitoring a group common PDCCH;
detecting a demodulation reference signal (DMRS) of the group common PDCCH; or
detecting a preamble preceding the TXOP.

10. A method, comprising:
receiving, by a processor of a user equipment (UE), a downlink (DL) transmission in a New Radio unlicensed spectrum (NR-U) from a base station of a wireless network during a DL transmission opportunity (TXOP); and
monitoring, by the processor, to detect a leading physical downlink control channel (PDCCH) in the DL TXOP by:
buffering packets of an amount of received signal; and
decoding a physical downlink shared channel (PDSCH) in the buffered packets, the PDSCH preceding the leading PDCCH.

11. The method of claim 10, wherein the monitoring comprises:
monitoring according to a first PDCCH monitoring behavior during a phase of detection of a beginning of the DL TXOP; and
monitoring according to a second PDCCH monitoring behavior after the phase of detection of the beginning of the DL TXOP, the second PDCCH monitoring behavior being different from the first PDCCH monitoring behavior.

12. The method of claim 11, wherein the second PDCCH monitoring behavior is pre-configured or configured after the phase of detection of the beginning of the DL TXOP, and wherein, in an event that the second PDCCH monitoring behavior is configured after the phase of detection of the beginning of the DL TXOP, the second PDCCH monitoring behavior is configured via radio resource control (RRC) signaling or via a PDCCH in a detected DL TXOP.

13. The method of claim 11, wherein the first PDCCH monitoring behavior comprises a first set of control resource set (CORESET) configurations and a first set of search space configurations, and wherein the second PDCCH monitoring behavior comprises one of:

a second set of CORESET configurations, which is different from the first set of CORESET configurations, and a second set of search space configurations, which is different from the first set of search space configurations;
the first set of CORESET configurations and the second set of search space configurations; or
the second set of CORESET configurations and the first set of search space configurations.

14. The method of claim 13, wherein a resource element group (REG) size of the first set of CORESET configurations is larger than or equal to a REG size of the second set of CORESET configurations, wherein a duration of the first set of CORESET configurations is shorter than or equal to a duration of the second set of CORESET configurations, and wherein a bandwidth of the first set of CORESET configurations is smaller than or equal to a bandwidth of the second set of CORESET configurations.

15. The method of claim 13, wherein a monitoring periodicity of the first set of search space configurations is shorter than or equal to a monitoring periodicity of the second set of search space configurations, wherein a PDCCH monitoring pattern of the first set of search space configurations is denser than or equal to a PDCCH monitoring pattern of the second set of search space configurations, and wherein a total number of PDCCH candidates of the first set of search space configurations is smaller than or equal to a total number of PDCCH candidates of the second set of search space configurations.

16. The method of claim 11, wherein the monitoring to detect the leading PDCCH according to the first PDCCH monitoring behavior comprises detecting a beginning of a TXOP by performing one of:
monitoring a group common PDCCH;
detecting a demodulation reference signal (DMRS) of the group common PDCCH; or
detecting a preamble preceding the TXOP.

17. A method, comprising:
detecting, by a processor of a user equipment (UE), a leading physical downlink control channel (PDCCH) in a downlink (DL) transmission opportunity (TXOP) from a base station of a wireless network in a New Radio unlicensed spectrum (NR-U); and
receiving, by the processor, a DL transmission in the NR-U from the base station during the DL TXOP,
wherein the detecting comprises:
monitoring according to a first PDCCH monitoring behavior during a phase of detection of a beginning of the DL TXOP; and
monitoring according to a second PDCCH monitoring behavior after the phase of detection of the beginning of the DL TXOP, the second PDCCH monitoring behavior being different from the first PDCCH monitoring behavior.

* * * * *